United States Patent [19]

Detmann et al.

[11] 3,749,884
[45] July 31, 1973

[54] SEMI-CONDUCTOR ALTERNATING CURRENT REGULATING MEANS

[75] Inventors: Walter Detmann, Niedervalluf; Gerhard Meid, Pfungstadt; Klaus Simon, Okriftel, all of Germany

[73] Assignee: Kalle Aktiengesellschaft, Wiesbaden-Biebrich, Germany

[22] Filed: Dec. 17, 1971

[21] Appl. No.: 209,194

[52] U.S. Cl. ............................ 219/501, 219/494
[51] Int. Cl. ............................................. H05b 1/02
[58] Field of Search................. 219/494, 497, 501; 323/3 C, 18, 22 SC, 24

[56] References Cited
UNITED STATES PATENTS

| | | | |
|---|---|---|---|
| 3,300,622 | 1/1967 | Swain | 219/497 |
| 3,371,191 | 2/1968 | Seney | 219/497 X |
| 3,519,917 | 7/1970 | Martin | 219/497 X |
| 3,586,830 | 6/1971 | Leitner | 219/497 X |
| 3,646,577 | 2/1972 | Ernst | 219/501 X |
| 3,651,753 | 3/1972 | Schmidt | 219/501 X |

Primary Examiner—Bernard A. Gilheany
Assistant Examiner—F. E. Bell
Attorney—James E. Bryan

[57] ABSTRACT

The specification discloses an alternating current regulating means, for use for example in a temperature control system, by means of which an alternating current flowing in a load circuit is controlled in an ON/OFF manner in response to and in accordance with a small DC control signal such as may be provided, for example, by a process computer.

The regulating means includes a semi-conductor switching means controlled by a control means which is responsive to a converted DC control signal obtained from a signal convertor which provides electrical isolation between the DC control signal source and the switching means. The control means is also controlled so that the switching means is rendered conductive only when the AC supply voltage is of substantially zero value, and so that only an even number of half-cycles of current is passed.

The DC control signal may be of analogue or digital form, and may be provided in the latter case by electrical relay contacts.

6 Claims, 6 Drawing Figures

SEMI-CONDUCTOR ALTERNATING CURRENT REGULATING MEANS

The present invention relates to a semi-conductor alternating current regulating means for the automatic (closed-loop) or non automatic (open-loop) control of loads, which is controlled proportionally, digitally, or by contacts. This regulating means is particularly useful in the closed-loop control of extruder heating arrangements, and generally in the control technology of electronic control systems.

In the control (particularly of temperature) of electrically-heated industrial control systems there is a problem of exactly measuring out the energy input by a suitable regulating means in dependence upon the output signal of the control system error detector.

This can be performed by the use of an electro-magnetic relay with which the heating tapes or coils, connected directly to the AC supply voltage, are switched on and off, the relay being controlled by a two-state controller.

Since the introduction of uni- and bi-directional thyristors it is possible to avoid the disadvantages of such relays, as for example, the noise, high energy consumption, and above all the limited operational life, and to switch alternating currents by means of semi-conductor regulating means having high reliability. Some circuit arrangements operate in an on/off manner, with switching occurring at random phase angle.

Other arrangements which permit continuous variation of the load control the phase angle of switching. Switching on at both random and controlled phase angles generates high transient voltages which can jeopardize the reliability of complex electronic installations, quite apart from the fact that under certain circumstances the thyristors themselves are subjected to impermissably high stresses.

In what follows the individual methods and circuit arrangements, and their particular defects will be considered in more detail.

The advantages of switching on at a controlled phase angle are obvious, since this requires only a simple circuit arrangement for controlling the power semi-conductor device at the highest possible regulating frequency. There are, however, considerable disadvantages. The crystal of the Triac or Thyristor is subjected to increased stresses which must be taken into consideration when sizing these devices. Furthermore, considerable transient noise voltages are generated, for the suppression of which additional expenditure is necessary. Particularly for those who employ process computers it is of great importance to maintain transient noise voltages as small as possible, in order to avoid interference. Moreover, even with a resistive load a reactive current dependent on the control phase angle is produced. In a larger installation this is not a factor to be ignored when planning the electrical equipment.

On account of these disadvantages phase angle control for the regulating means, particularly for electrical heating arrangements, cannot be considered.

Pulse gating operates by the formation of a running average value. In this control method the average value of the switched power is continuously formed, and this is compared with the input signal by a feedback circuit.

The error signal so produced causes the circuit each time on demand to switch on for a whole cycle of the supply voltage, until equality between the input signal and the average value of the output power is reached.

The method of pulse gating is, after phase angle control, the best approximation to continuous control. It is well suited to resistive loads, but in the case of inductive load devices the power semi-conductor device is more highly stressed than with pulse group switching. For inductive loads an increased transient current arises on switching on. In the case of pulse group switching, with a cycle time of 2 seconds, switching on occurs only every 2 seconds, whilst with pulse gating through the formation of the running average value, for a regulating ratio of 50 percent, switching on occurs every 40 milliseconds. This means that the high transient current of the power semiconductor device must be overcome almost continuously.

Controlled switching of the power semi-conductor device is important for the electrical stressing of the device.

Switching on of the power semi-conductor at the zero voltage point in the AC supply voltage cycle has been proposed. In this case the crystal stress is small, the production of high frequency transients is substantially avoided, and with resistive loads no reactive load is generated.

Against this, greater expenditure on the control circuit is incurred, and a smaller control frequency is obtainable.

Switching on at the zero voltage point in the case of pulse group switching is preferable, but in the case of pulse gating nothing else can be considered.

It is therefore the object of the present invention to provide a contactless regulating means which is universally applicable, and which for the avoidance of the disadvantages of the above mentioned circuit arrangements will fulfil the following requirements.

One requirement is that the AC supply network shall not be loaded with direct current. Triacs or Thyristors change from the conducting to the non-conducting state when the current falls to zero value. Random switching of positive or negative half-waves has as a possible consequence that an unequal number of positive and negative current half-waves may be taken from the supply source. In such a case a direct current component may arise as average value, and this can lead to polarised magnetisation of transformers in the power supply system. If this is to be avoided, only complete sine waves should be switched.

Spurious switching-on of the Triac or Thyristor by voltage spikes must be reliably prevented. These spikes can come from the supply network, or be caused by the power semi-conductor device itself on switching off an inductive load.

By suitable means the rate of voltage rise across the power semi-conductor device may be limited to the permissible value.

The Triac or Thyristor is operated as a rule near to its permissible load limit, so that protection against short-circuit and overload is necessary.

A further feature of recent times is the tendency to control as many as possible industrial processes by process computer. Thus, for example, the use of process computers for the automatic control of plastics manufacturing machines is ever increasing. To keep costs low alternating current regulating means should be controlled directly by the computer. For this purpose the electro-magnetic relay is unsuited, since it needs a large operating power. Hence power amplifying means must be used between the output of the computer and the relay.

It thus appears desirable to provide an alternating current switch on an electronic basis which can be directly energised by the computer, and whose life is independent of the number of switching operations performed.

The use of process control systems in larger installations is increasing more and more. For the sake of uniformity the temperature controlling circuits of the extruder, for example, should be equipped with similar automatic control systems. The output signal of such control systems is a continuous modulated direct current of between 0 and 20 milli-amps. However, no digitally working regulating means can be controlled by such an output signal.

Another difficulty is that resistive as well as inductive heating arrangements are to be found. The majority of electronic regulating means available on the market can handle only purely resistive loads. Thus apparatus is needed which can also handle inductive loads with a power feature down to about 0.7.

Accordingly, the present invention provides a semiconductor alternating current regulating means (which is particularly suitable for the control of heating arrangements) in which the load is connected through a load switch by means of a semi-conductor regulating means, in integrated form, comprising an input amplifier/comparison stage, a pulse switch, and a synchronising stage which feeds back the voltage drop across the load to the pulse switch, and which is distinguished in that a. the input amplifier stage of the integrated circuit has connected thereto on its input side for digital input control — a DC voltage convertor via an electronic control device, for proportional input control — a DC voltage convertor and a saw tooth generator, and for contact input control — a suitable matching circuit;

b. switching occurs only at the zero voltage points of the AC supply voltage and only after even numbers of supply half-waves; and c. electrical separation between the load and signal circuits is obtained by a single transformer.

In a preferred arrangement, particularly for the control of inductive loads, switching of the supply voltage half-waves results from pulse group switching.

The parts employed will now be described in more detail. The standard electric signal of the control art is converted in a DC voltage convertor into a DC voltage corresponding to the circuit. The DC voltage convertor itself consists of a blocking oscillator with a transformer. The resulting AC voltage is taken from the secondary winding of the transformer, and is rectified, and smoothed. The test voltage between primary and secondary windings can be varied; it amounts according to the relevant safety regulations of the present time to 2.5 kilo-volts.

A semi-conductor module with pronounced threshhold and negative characteristics, in combination with a time determining circuit (resistors and condensers) is used as a saw-tooth generator.

The charging action of the module is made linear through a suitable arrangement which delivers a constant charging current. The charging of the condenser is thus strictly proportional to time. When the voltage of the condenser reaches the thresh-hold voltage, predetermined in the semi-conductor module, the condenser suddenly discharges, the semi-conductor module blocks, and the charging process begins anew.

For the cycle time of this charge/discharge process one chooses a time which is greater than the thermal time constant of the control circuit. The cycle time can be adapted by external circuitry of the semi-conductor element to different requirements. As according to the invention only an even number of successive supply half-waves should be switched, one can achieve with a supply frequency of, for example, 50 cycles per second and a cycle time of 2 seconds a resolution dependent upon the input voltage of 1 percent.

A regulating means according to the present invention is suitable for switching slightly capacitive, purely ohmic, and inductive loads at any power factor.

The ability to switch inductive loads is particularly required, for example, in the field of eddy current heating.

Although all control operations can be carried out with the regulating means according to the present invention, as for example in motor and magnetic valve control, this regulating means has in practice proved itself particularly in the control of temperature of melts. For thermo-plastic melts the temperature control of extruders, pipes and nozzles in particular has been controlled by control means according to the present invention.

One alternating current regulating means according to the present invention as applied to an automatic heating system for an extruder of plastics materials will now be described in greater detail by way of example and with reference to the drawings in which.

Figure 1:
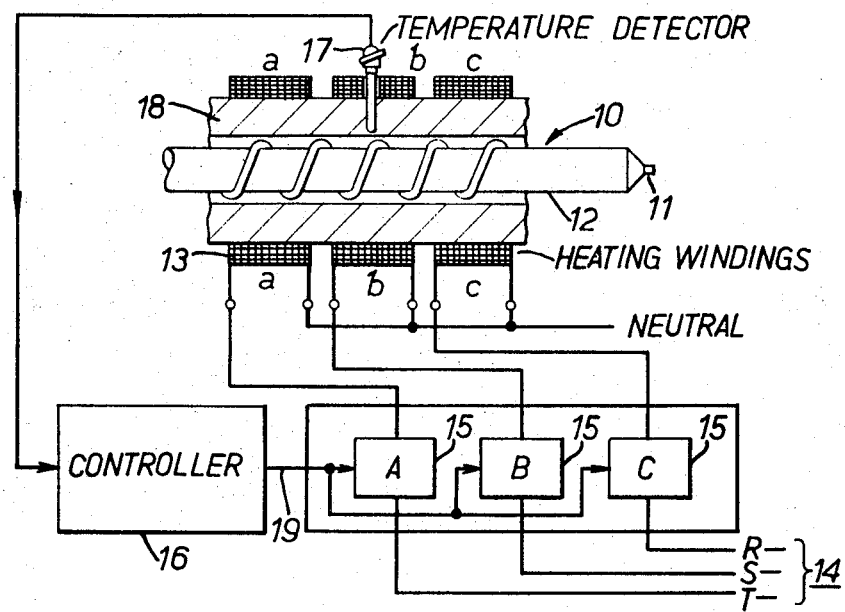
FIG. 1 shows schematically the general arrangement of the heating system and extruder.

Referring now to the FIG. 1 of the drawings an extruder 10 includes a nozzle 11 and a supply pipe 12 for conveying plastics material in molten form to the nozzle for extrusion. In order to maintain the plastics material at the correct temperature for extrusion the supply pipe is provided with an automatic electrical heating system which includes a plurality of heating coils 13 wrapped closely around the supply pipe and connected for supply with alternating current from the rspective phases L,S,T, of a three phase supply source 14. The supply of alternating current to the respective heating coils is controlled by a plurality of alternating current regulating means 15 acting under the common control of a temperature controller 16. This controller includes adjustable means (not shown) for providing a temperature reference signal, and receives a temperature dependent feedback signal from a temperature detector 17 housed in an insulating jacket 18 which encloses the supply pipe. The controller supplies at its output signal circuit 19 a temperature error signal which is dependent on the deviation of the actual temperature from the desired value set by the reference signal, and this error signal is supplied to the respective alternating current regulating means 15 as a control signal.

The temperature feedback signal, the temperature reference signal, and the temperature error signal are all analogue signals.

Figure 2:
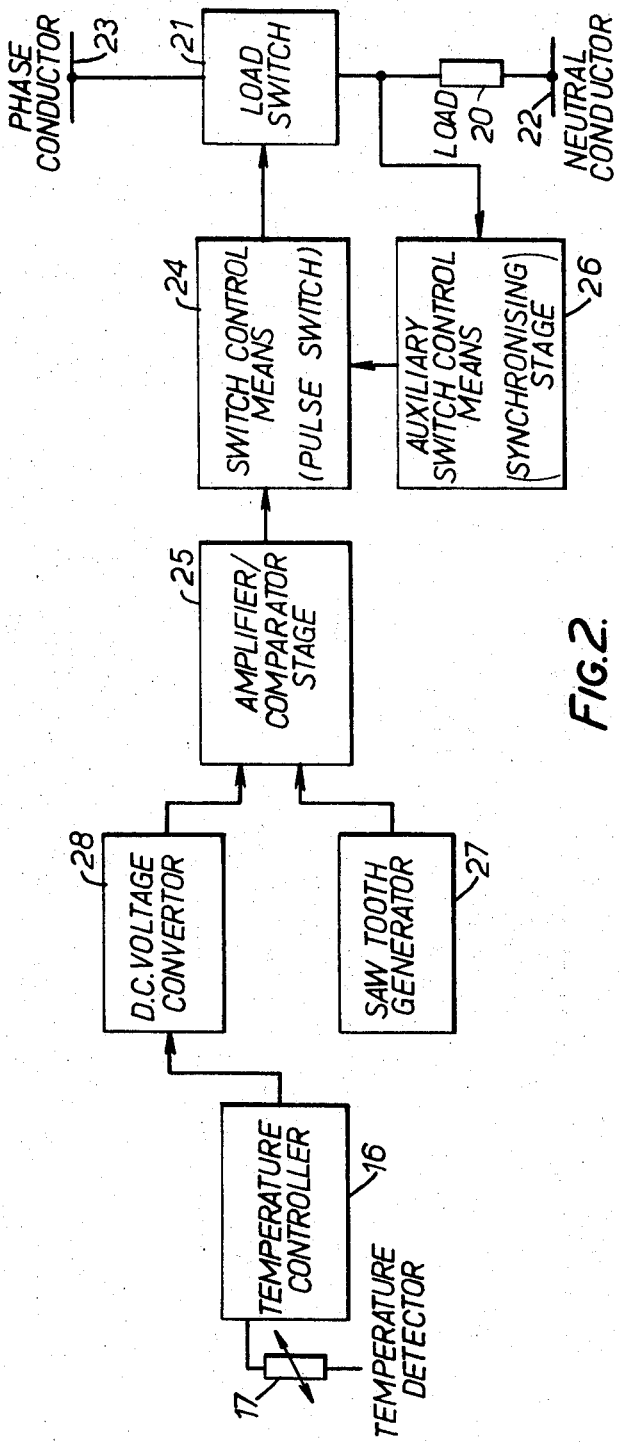
FIG. 2 shows a block diagram of the electrical apparatus of the heating system, for control by means of an analogue control signal.

Each regulating means is shown in more detail in FIG. 2 in which the heating coils of the particular phase are shown as a load 20 connected in series with a semi-conductor load switch 21 between the neutral conductor 22 and the appropriate phase conductor 23 of the supply source. The load switch 21 comprises a bi-directional silicon controlled rectifier (SCR), and will be referred to hereafter in this description as a 'triac.'

Control pulses for rendering the triac conductive are derived from a switch control means 24 in response to input signals provided by an amplifier 25, and under the control of an auxiliary control means 26.

The amplifier receives input signals from two sources, namely from (a) a saw-tooth generator 27 and (b) a control signal convertor 28.

This convertor in turn receives as its input signals control signals from the temperature controller 16, and the controller receives as its input signals temperature dependent feedback signals from the temperature detector 17, and its internal temperature reference signal.

The auxiliary control means receives a signal dependent on the AC voltage appearing across the triac 21, and operates in response thereto to provide synchronising signals so that the switch control means 24, in response to a signal from the amplifier 25, supplies control pulses to the triac only when the AC voltage across the triac is of substantially zero value, and so that on termination of the control signal from the amplifier 25 conduction of the triac is maintained until the next end of an even half cycle.

The saw tooth generator 27 is a conventional generator and is used to convert the analogue control signal provided by the convertor 28 into a digital signal of time duration dependent on the magnitude of the analogue control signal. This conversion occurs in the amplifier 25.

Figure 5:
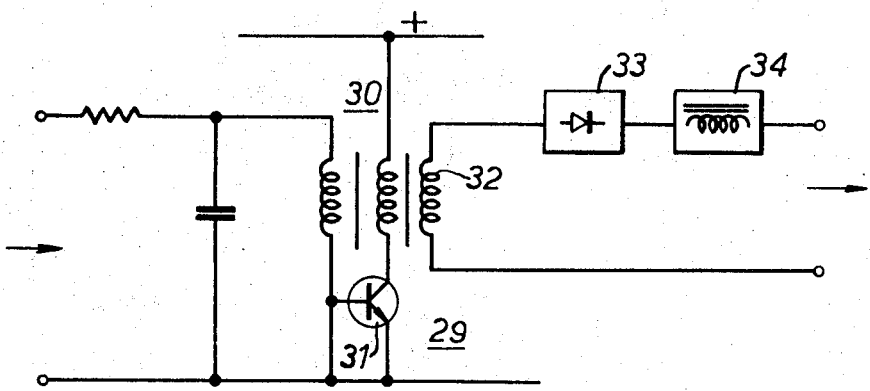
FIG. 5 shows a circuit diagram of a control signal converter forming part of the electrical apparatus shown in the FIG. 2.

The convertor 28 has a circuit as shown in the FIG. 5, and serves the dual functions of converting the incoming DC control signal to a form suitable for the amplifier 25, and of providing electrical isolation of the incoming control signal circuit and the outgoing converted control signal circuit. In this way the delicate low voltage circuitry of the temperature controller 16 is electrically isolated from the high voltage circuit of the load circuit 20 and its switching and associated control means.

The convertor comprises a blocking oscillator circuit 29, with transformer coupling 30 between the base and collector circuits of a transistor 31. A third winding 32 on the transformer 30 provides the output signal (converted control signal), and this signal is rectified and smoothed in conventional manner at 33 and 34.

Figure 6:
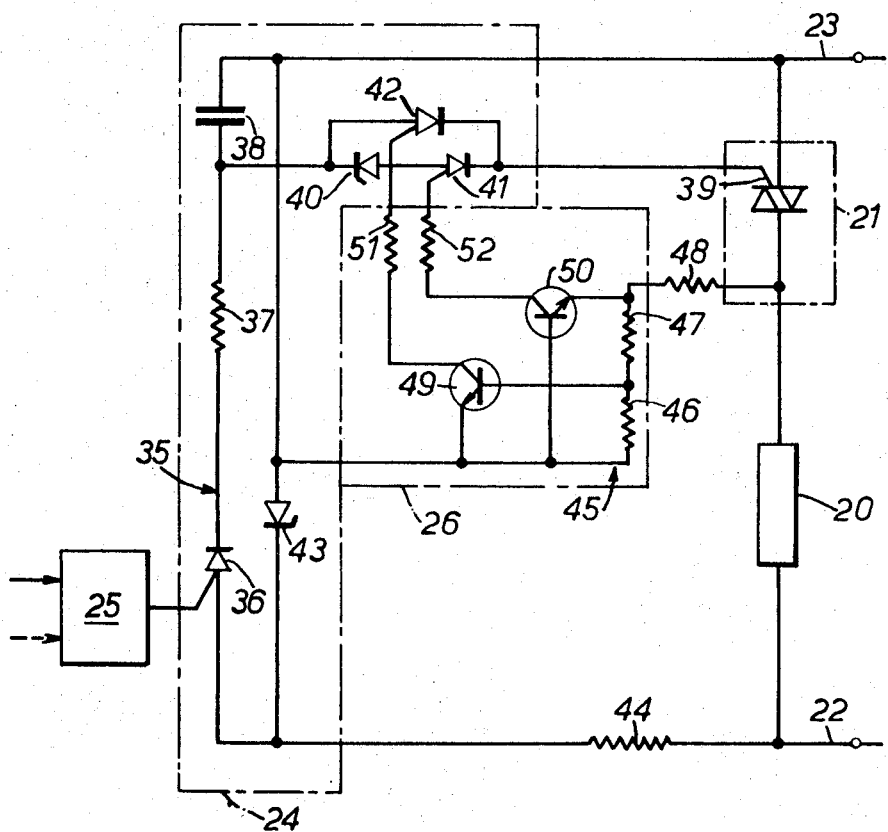
FIG. 6 shows a circuit diagram of an auxiliary control means forming part of the electrical apparatus shown in the FIG. 2.

The auxiliary control means 26 has a circuit as shown in FIG. 6, which also shows typical constituent parts of the load switch 21, and the switch control means 24.

In this FIG. 6 the switch control means 24 includes a series circuit 35 comprising an SCR 36, a resistor 37 and a capacitor 38, the SCR being connected adjacent the neutral conductor 22, and being controlled by the amplifier 25. A circuit connecting a point between the resistor 37 and capacitor 38 and the trigger electrode 39 of the triac 21 includes a parallel circuit which has in one branch circuit a Zener diode 40 and an SCR 41, and in the other branch circuit an SCR 42.

A Zener diode 43, operating in conjunction with a resistor 44, serves to limit the voltage to be developed across the series circuit 35 which includes the capacitor 38.

The auxiliary control means 26 includes a series resistor circuit 45 connected across the triac 21, and including resistors 46–48. Two n.p.n. transistors 49 and 50 having their respective base-emitter circuits connected in the manner shown across the resistors 46 and 47, andtheir collectors connected through resistors 51 and 52 to the trigger electrodes of the SCR's 42 and 41 respectively.

In response to an output signal from the amplifier 25 the SCR 36 is rendered conductive so that the capacitor 38 receives charge during each negative half cycle, i.e., when the neutral conductor 22 is positive with respect to the phase conductor 23. At the beginning of each negative half cycle the transistor 49 becomes conductive to trigger the SCR 42 whereas at the beginning of each positive half cycle the transistor 50 becomes conductive to trigger the SCR 41.

The capacitor 38 is charged sufficiently during each negative half cycle to enable the SCR 41 to be triggered during the succeeding positive half cycle, so that even after the output signal of the amplifier 25 has ceased to hold the SCR 36 conductive, conduction of the triac 21 is ensured in the positive half cycle. Thus the triac is held conducting always for an even number of half cycles.

Figure 3:
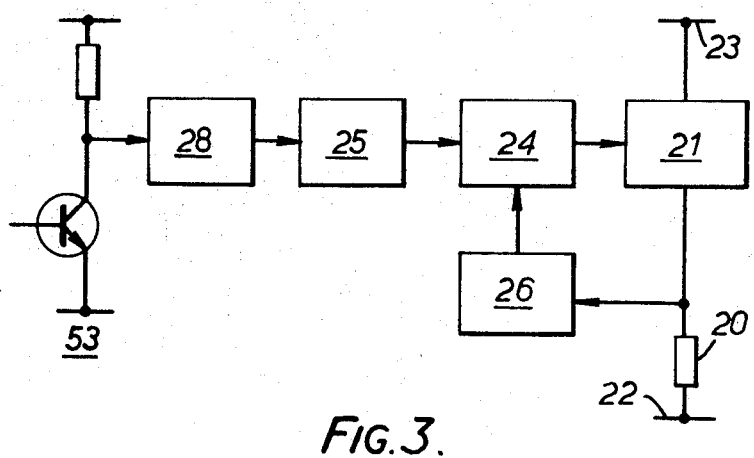
FIG. 3 shows a block diagram of the electrical apparatus of the heating system, for control by means of a digital control signal.

Though in FIG. 1 the control signal convertor 28 has been supplied with an analogue signal, it could be fed directly with digital control signals, in which case the saw-tooth generator 27 is no longer necessary and is omitted. Such an arrangement is illustrated in the FIG. 3, where the digital control signlas are derived from an output transistor circuit 53 of a digital temperature controller. Such a digital controller may comprise a digital computer which processes the feedback and reference signals to provide a digital error signal for controlling the alternating current regulating means in a temperature corrective sense.

Figure 4:
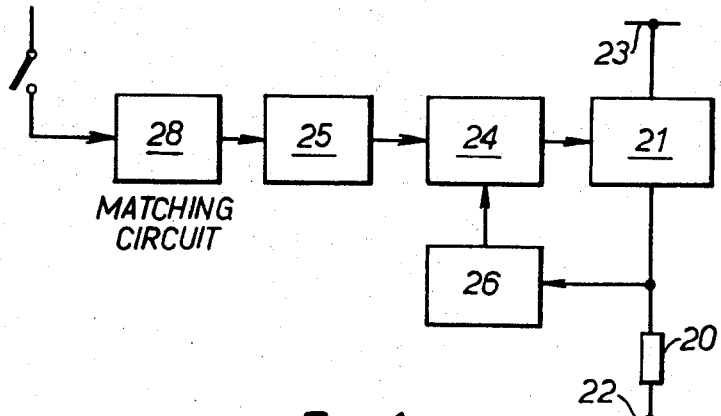
FIG. 4 shows a block diagram of the electrical apparatus of the heating system, for control by means of an electrical relay contact.

As a still further alternative, the alternating current regulating means may be controlled in an ON/OFF manner by an output electrical relay contact of the temperature controller, the contact being opened and closed automatically so that the time average of the closed periods is proportional to the temperature error signal. This arrangement is disclosed in the FIG. 4. In this case the control signal convertor may need to include suitable matching circuit elements. The relay contact is shown at 54.

We claim:

1. Alternating current regulating means for use in an electric control system, comprising:
   semi-conductor switch means for connection with an alternating current supply source and a load circuit which is to be controlled by the control system;

switch control means connected to the semiconductor switch means for supplying thereto control pulses for enabling the switch means to become conductive and allow alternating current to flow in the load circuit;

control signal conversion means connected to the switch control means for converting direct current input control signals supplied by the control system into converted signals which are dependent thereon but are electrically isolated therefrom, the converted signals causing the switch control means to supply control pulses to the switch means, first auxiliary control means connected to the switch control means for ensuring that in the presence of a converted control signal the switch control means supplies control pulses to the switch means only when the instantaneous value of the alternating current supply voltage is of substantially zero value; and second auxiliary control means connected to the switch control means for ensuring that the conductive state of the switch means, induced by the presence of a control signal, is maintained until the first end of an even half cycle of current flow in the load circuit following the termination of that control signal, whereby conduction of alternating current in the load circuit in response to the presence of a control signal occurs for an even number of current half-cycles only.

2. Alternating current regulating means according to claim 1 wherein the control signal conversion means includes a blocking oscillator having an input circuit for receiving the direct current control signals and an output circuit which is transformer-coupled with the input circuit, and rectifying means connected to the oscillator output circuit for rectifiying the magnetically-induced output circuit signals, the latter signals being supplied as input signals to the switch control means.

3. Alternating current regulating means according to claim 2 including a digital control circuit connected to the control signal conversion means for supplying thereto the direct current control signals.

4. Alternating current regulating means according to claim 2 including an analogue control circuit connected to the control signal conversion means for supplying thereto the direct current control signals, and including connected between the control signal conversion means and the switch control means a signal combining means for combining the converted control signals with a saw-tooth reference signal from a saw-tooth generator, whereby to supply the switch control means with digital signals.

5. Alternating current regulating means according to claim 2 including an electrical switch contact and a signal matching circuit connected to the control signal conversion means whereby to supply the direct current control signals.

6. A temperature dependent control system for an electrical heating system having heating elements connected for supply from an alternating current supply source through an alternating current regulating means according to claim 1, the said control signal being a signal dependent on the temperature achieved by the heating system.

* * * * *